United States Patent Office 3,533,922
Patented Oct. 13, 1970

3,533,922

COMPOSITION AND PROCESS FOR PLATING FERROMAGNETIC FILM

Peter P. Semienko, Roslindale, and Emil Toledo, Natick, Mass., assignors to Honeywell Inc., Minneapolis, Minn., a corporation of Delaware No Drawing. Filed June 26, 1968, Ser. No. 740,069
Int. Cl. C23b 5/32
U.S. Cl. 204—43 11 Claims

ABSTRACT OF THE DISCLOSURE

Ferromagnetic nickel-iron-cobalt is electroplated on a conductive substrate from an acidic aqueous plating solution having nickel introduced both as nickel sulfate and as nickel chloride, having iron introduced as ferrous ammonium sulfate and having cobalt introduced as cobaltous sulfate. The solution also has potassium chloride, saccharin, and wetting and buffering agents.

BACKGROUND OF INVENTION

This invention relates to a composition and a process for electroplating a nickel-iron-cobalt alloy having useful ferromagnetic properties. The composition is a relatively stable solution that is easy to control. It plates with high yield a ferromagnetic film having superior magnetic properties, particularly for binary information storage. Hence the invention is particularly suited for preparing a plated wire memory element as described by T. R. Long in "Electrodeposited Memory Elements for a Nondestructive Memory," J. of App. Phy., May 1960.

Prior art chemical solutions and techniques for the preparation of ferromagnetic plated films for digital information storage, such as are discussed in "Electrodeposition of Magnetic Materials" by I. W. Wolf, J. of App. Phy., supp. to vol. 33, No. 3, March 1962, often have relatively poor yield of acceptable product, require relatively careful control, and have limited ability to produce films useful over wide operating conditions. For example, where the film is plated on a cylindrical conductor for use as a plated wire memory element, such an element plated from a prior art composition frequently has relatively low tolerence to variations in digit current and is relatively sensitive to so-called "disturb" problems. In addition, the problem of attaining a commercially suitable magnetic film has also been complicated by the requirement that the anisotropy field $H_K$, and the coercivity field, $H_C$, of the film have the proper values for efficient operation of the film as a digital storage element.

Accordingly it is an object of this invention to provide an improved fluid composition and process for the electrodeposition of a ferromagnetic film.

A more particular object of the invention is to provide a fluid composition and process for electroplating a ferromagnetic film having superior binary information storage properties.

Another object of the invention is to provide a fluid composition and process for preparing the magnetic film of a plated wire memory element suited for commercial use.

It is also an object of the invention to provide a stable chemical solution that is relatively easy to control to provide a high yield of magnetic film having superior ferromagnetic properties.

Other objects of the invention will in part be obvious and will in part appear hereinafter.

The invention accordingly comprises a composition of matter possessing the characteristics, properties, and the relation of constituents exemplified in the compositions hereinafter described, and the several steps and the relation of one or more of such steps with respect to each of the others, all as exemplified in the following detailed disclosure, and the scope of the invention is indicated in the claims.

SUMMARY OF INVENTION

This invention overcomes the foregoing difficulties, and attains the above objects, by providing a nickel-iron-cobalt plating solution in which a major constituent is nickel introduced as soluble nickel salts, and in which iron is present as a complex ferrous ion. A lesser amount of cobalt is in the solution to give the resultant film the desired level of anisotropy field and to diminish changes in the magnetic properties of the film over a prolonged operating life.

Further in accordance with the invention, the nickel source ions are introduced into the solution both as nickel sulfate and as nickel chloride. The chloride from the latter source improves conductivity of the solution, produces equi-axed plating in lieu of the columnar deposit produced from a straight sulfate bath, and maintains the nickel anode active. The solution also includes potassium to control the magnetic hysteresis characteristics of the film being plated. Saccharin is present in the solution to enhance the uniformity of the plating process along the conductor being plated and to assure that the film is plated with minimum stress. A buffer agent such as boric acid is present to minimize changes in the solution acidity during extended use.

The solution is plated in a process where the conductor to be plated is the cathode of an electroplating cell. It is considered desirable to have the conductor surface clean and free of imperfections. A suitable surface is prepared by electro-etching or otherwise removing from the conductor substantially all drawing or other processing defects and inclusions. Thereafter the conductor surface is rebuilt, as by plating, as desired for the substrate on which to deposit the magnetic film.

DESCRIPTION OF PREFERRED EMBODIMENTS

More specifically, the plating solution includes the following constituents substantially in the ranges indicated:

TABLE

| Constituent: | Quantity, gms./liter |
|---|---|
| Nickel sulfate [$NiSo_4 \cdot 6H_2O$] | 150–200 |
| Nickel chloride [$NiCl_2 \cdot 6H_2O$] | 140–180 |
| Cobalt sulfate [$CoSO_4 \cdot 7H_2O$] | 0.8–1.2 |
| Ferrous ammonium sulfate [$Fe(NH_4)_2 \cdot (SO_4)_2 \cdot 6H_2O$] | 10–14 |
| Potassium chloride [KCl] | 2.0–3.5 |
| Acid saccharin | 1.0–2.5 |
| Sodium lauryl sulfate | 0.006 |
| Boric acid [$H_3BO_3$] | 35–60 |
| Water, 6.5 liters. | |

The constituents are preferably of reagent grade except for the water which is preferably distilled. Alternatively, technical grade chemicals that are carbon treated can be used.

The resulting plating solutions have 70–100 grams/liter of nickelous ion ($Ni^{++}$), and 1.65–2.10 grams/liter of ferrous ion ($Fe^{++}$). The concentration of cobalt ion ($Co^{++}$) is between .07 and .25 gram/liter, depending on the value of hard axis saturation field, or anisotropy field $H_K$, desired in the plated film. In addition, saccharin is present in an amount between 1.2–1.7 grams/liter. Further, potassium ion ($K^+$) is present in a concentration of 1.0 to 1.8 grams/liter, sulfate ions ($SO_4^{--}$) in a concentration of 55.3 to 73.4 grams/liter, and diatomic chloride ions ($Cl_2^{--}$) in a concentration of 42.5 to 54.9 grams/liter. The plating solution also has 5.8 to 8.1 grams/liter of ammonium sulfate ion $$[(NH_4)_2(SO_4)_2]^{--}$$

The solution pH is between 1.8 and 2.8 with 2.2 to 2.5 being the preferred range. The specific gravity of the solution is between 1.17 and 2.10.

The solution is typically plated with a current density of 550 ±5% milliamperes per square centimeter and a solution temperature of 69 ±0.5 degrees centigrade.

The plated film is sufficiently thin to attain high speed memory operation and yet thick enough to provide the desired magnitude of output voltage. A typical practical range for the film thickness is between 0.7 micron to 1.25 microns.

It is considered desirable to prepare the solution by heating the major portion of the water in two containers, each having roughly equal amounts, one to around 70°–80° C., preferably 75° C. and the other to around 20°–30° C., preferably 25° C. The nickel sulfate, boric acid, and acid saccharin are added to the hot solution with continuous strong stirring to dissolve these chemicals. The nickel chloride and potassium chloride are added to the other, cool solution also with continuous stirring. After the latter chemicals have dissolved, the cobaltous sulfate and ferrous ammonium sulfate are added to the cool solution. When the chemicals added to both portions of the water are dissolved, the two portions are combined, and the balance of the water and the sodium lauryl sulfate added. The boric acid buffering agent may be provided in either the hot or cool solution or mixture thereof.

The temperature of the hot solution is such that the nickel sulfate, boric acid and acid saccharin constituents added to it dissolve essentially completely in a short time. The other constituents dissolve without requiring such an elevated temperature. Further, the ferrous ammonium sulfate is dissolved in a cool water solution to minimize oxidation of ferrous ions to ferric ions, which are considered deleterious to the solution.

A substantial portion, roughly half, of the nickel is introduced into the solution as nickel sulfate as indicated rather than other nickel compounds because of the ease with which nickel sulfate dissolves. Further, sulfate ions are compatible with other ions in the solution, their introduction with the nickel does not introduce an additional kind of ion, and an excess of sulfate ions is considered desirable to form complexes with the ferrous ions. An almost equal amount of the nickel is added as nickel chloride to introduce chloride ions to the solution for cleaning the electrodes from passivation. Chloride ions are also desired in the solution to enhance the electrical conductivity of the solution and to enhance equi-axed plating. The saccharin relieves whatever stress the chloride ion tends to cause in the plated film. The saccharin also enhances the uniformity of the plating along the substrate to ensure that a uniformly continuous plating results. Further, the saccharin is considered desirable to control the anisotropy field $H_K$ of the plated film; the amount of cobalt is hence adjusted in proportion to the desired $H_K$ value.

Potassium is added to the solution for the purpose of giving the plated film an open, substantially rectangular, magnetic hysteresis loop in the easy direction of magnetization. Introducing the potassium as potassium chloride, where chloride ion is already present in the solution, restricts the kinds of ions in the solution to a desirably small number. On the other hand, it is considered that excessive potassium would be present in the solution if all the desired chloride were added in the form of potassium chloride rather than introducing some chloride with nickel as nickel chloride as listed in the foregoing table.

The ferrous ammonium sulfate introduces the iron in the form of a complex ferrous ion that in the solution has little tendency to oxidize to the ferric valence; ferric ions are undesirable because they tend to form precipitates. A complex ferrous ion source is also considered desirable to form the magnetic plating with a fine grain structure.

Cobalt is introduced to the solution as cobaltous sulfate rather than in another form because sulfate is already present and aids in attaining a fine grain plating. The cobalt itself is desired for the dual purpose of controlling the anisotropy field characteristic of the plated film and of stabilizing the aging properties of the resultant film. To satisfy the former objective the amount of cobalt is adjusted within the range in the table, with increasing cobalt for higher $H_K$.

Bonding of the film constituents to the conductive substrate also is enhanced by the sodium lauryl sulfate, which acts as a wetting agent. The boric acid, as noted, serves as a buffer agent to maintain the solution pH relatively stable. This is desired because a pH in excess of 3 results in significant ferrous ion being oxidized to the undesired ferric ion. A pH substantially lower than 1.6 is considered excessively acidic and has been observed to result in relatively poor plating, specifically nonuniform plating.

The following examples illustrate the practice of the invention, but the invention is not limited to these specific values.

EXAMPLE I

| | Gms. |
|---|---|
| $NiSO_4 \cdot 6H_2O$ | 1,500 |
| $NiCl_2 \cdot 6H_2O$ | 1,350 |
| $CoSO_4 \cdot 7H_2O$ | 8 |
| $Fe(NH_4)_2 \cdot (SO_4)_2 \cdot 6H_2O$ | 110 |
| KCl | 20 |
| Acid saccharin | 11 |
| Sodium lauryl sulfate | .05 |
| $H_3BO_3$ | 450 |

Water, 6.5 liters.

The solution was electroplated on a beryllium copper wire with a current density of 550 Ma./cm.$^2$ and a solution temperature of 69° C. The resultant plated wire when operated as a plated wire memory element in a nondestructive readout operation produced on reading with no disturb signals applied to the element, an output voltage consistently in excess of 15 millivolts. This output voltage dropped only to 12 millivolts when the element was subjected to repeated disturb signals. Further, the magnetic film exhibited an anisotropy field of 4 oerstads and a coercivity field of 1.8 oerstads. These properties of the film were stable over a prolonged operating time, even at elevated temperature.

EXAMPLE II

Another plating solution was prepared with the constituents present in the following amounts:

| | Gms. |
|---|---|
| $NiSo_4 \cdot 6H_2O$ | 1,500 |
| $NiCl_2 \cdot 6H_2O$ | 50 |
| $CoSO_4 \cdot 7H_2O$ | 50 |
| $Fe(NH_4)_2 \cdot (SO_4)_2 \cdot 6H_2O$ | 110 |
| KCl | 20 |
| Acid saccharin | 3 |
| Sodium lauryl sulfate | .05 |
| $H_3BO_3$ | 450 |

Water, 6.5 liters.

The solution was again electroplated on a beryllium copper strand as for Example I and the resultant product operated as an NDRO plated wire element. The only significant difference in this film as compared to that produced in Example I was a higher $H_K$, specifically of 4 to 10 oerstads, and a coercivity field of 2–3 oerstads, which is higher than in Example I. This was expected because in Example II the plating solution has more cobalt and less saccharin than the solution in Example I.

Although the invention is considered preferably practiced as set forth above for most instances, where desired, potassium ammonium sulfate $[K_2(NH_4)_2(SO_4)_2 \cdot 6H_2O]$ can be added to the plating solution in the amount of 1.0 to 3.0 grams per liter. This increases the ammonium sulfate in solution and can protect further against oxidation of ferrous ion. Since potassium is already present in the solution from the potassium chloride, the additional potassium can serve to improve the hysteresis characteristics of the film as noted, and may contribute to the fine structure of the plated film and to secure bonding of the film to the substrate.

Further, saccharin can be introduced in the form of sodium saccharin. Similarly, wetting agents other than sodium lauryl sulfate, and buffer agents other than boric acid, can be used.

In addition to the adavntages noted herein above, the present plating solution has a yield of magnetically plated wire elements acceptable for commercial use in a computer memory in excess of 90%. The plated film exhibits an unusually low sensivity to mechanical stress. That is, its magnetic properties remain relatively unaffected when the plated article is stressed. Further, the plating solution is relatively inexpensive to prepare and maintain, and it has a long plating life. As indicated, the magnetic properties of the plated film, including the anisotropy and the coercive force, can be controlled with this solution by adjusting the amounts of cobalt and of saccharin. In addition, by introducing nickel both as nickel sulfate and as nickel chloride, the solution is capable of sustaining a comparatively high concentration of nickel source ions.

It will thus be seen that the objects set forth above, among those made apparent from the preceding description, are efficiently attained. It is also to be understood that the following claims are intended to cover all the generic and specific features of the invention herein described, and all statements of the scope of the invention which as a matter of language, might be said to fall therebetween.

Having described the invention, what is claimed as new and secured by Letters Patent is:

1. An aqueous electrolytic plating bath for the deposition of a ferromagnetic coating on an electrically conductive substrate arranged as a cathode in the electrolytic deposition process, said bath (A) having a pH above a minimum value around 1.6 so that plating is uniform and below a maximum value around 3 so that no significant ferrous ion oxidizes to ferric ion, and (B) including as essential ingredients (1) $Ni^{++}$ ions in a concentration of approximately 70 to 100 grams per liter, (2) $Co^{++}$ ions in a concentration of approximately .07 to .25 gram per liter, (3) $Fe^{++}$ ions in a concentration of approximately 1.65 to 2.10 grams per liter, (4) $K^{+}$ ions in a concentration of approximately 1.0 to 1.8 grams per liter, (5) $SO^{--}$ ions in a concentration of approximately 55.3 to 73.4 grams per liter, (6) $Cl_2^{--}$ ions in a concentration of approximately 42.5 to 54.9 grams per liter, and (7) $[(NH_4)_2(SO_4)_2]^{--}$ ions in sufficient concentration to form soluble ferrous complexes with said ferrous ions to prevent significant formation of ferric ions.

2. A plating bath as defined in claim 1 further including saccharin in sufficient amount to relieve stresses in the ferromagnetic coating caused by the chloride ion.

3. A plating bath as defined in claim 2 further including boric acid in a concentration of approximately 35–60 g./l., sodium lauryl sulfate as wetting agent in a minor amount and wherein said saccharin is acid saccharin present in the concentration of approximately 1.0–2.5 g./l.

4. A plating bath as defined in claim 1 further characterized in that the pH is substantially between 2.2 and 2.5.

5. An aqueous electrolytic plating bath for the deposition of a ferromagnetic coating on an electrically conductive substrate arranged as a cathode in the electrolytic deposition process, said bath (A) having a pH in the range of 1.8 to 2.8 and (B) including as essential ingredients (1) dissolved nickel chloride in a concentration substantially between 140 and 180 grams per liter, (2) dissolved nickel sulfate in a concentration substantially between 150 and 200 grams per liter, (3) dissolved ferrous ammonium sulfate in a concentration substantially between 10 and 14 grams per liter, (4) dissolved cobaltous sulfate in a concentration of 0.8 and 1.2 grams per liter, and (5) dissolved potassium chloride in a concentration substantially between 2.0 and 3.5 grams per liter.

6. A plating bath as defined in claim 5 further including saccharin in sufficient amount to relieve stresses in the ferromagnetic coating caused by chloride ion.

7. A plating bath as defined in claim 6 further including sodium lauryl sulfate as wetting agent in a minor amount and wherein said saccharin is acid saccharin present in the concentration of approximately 1.0–2.5 g./l.

8. An aqueous acidic plating bath for electrolytically depositing ferromagnetic films of nickel-iron-cobalt, said bath consisting essentially of (A) nickelous ions in a concentration of 70 to 100 grams per liter introduced as nickel chloride and as nickel sulfate, (B) ferrous ion in a concentration of 1.65 to 2.10 grams per liter and introduced as ferrous ammonium sulfate, (C) dissolved cobaltous sulfate in a concentration of 0.8 to 1.2 grams per liter, (D) dissolved potassium chloride in a concentration of 2.0 to 3.5 grams per liter, (E) a buffering agent present in sufficient amount to achieve a bath pH of about 1.6 to about 3, and (F) saccharin in sufficient amount to relieve stresses in the ferromagnetic film caused by chloride ion.

9. A process of preparing an equeous bath for electroplating ferromagnetic Ni-Fe-Co on an electrically conductive substrate, said process comprising the steps of:

(A) dissolving, in a first warmed aqueous solution, nickel sulfate and saccharin in relative proportions of 150–200 parts by weight of nickel sulfate to 1.0–2.5 parts saccharin;

(B) dissolving, in a second aqueous solution cooler than said first aqueous solution, nickel chloride, potassium chloride and, thereafter, cobaltous sulfate and ferrous ammonium sulfate in relative proportions by weight of 140–180 parts nickel chloride to 2.0–3.5 potassium chloride to 0.8–1.2 cobaltous chloride to 10–14 ferrous ammonium sulfate, said proportions being proportional to each other and to 150–200 parts by weight of said nickel sulfate;

(C) combining and mixing said first and second solutions;

(D) adding sufficient water to the mixture of step C to produce a concentration of nickel sulfate between 150–200 g./l.; and (E) providing in one of said first and second solutions or in the mixture thereof a buffering agent in sufficient amount to maintain the pH of said bath in a range substantially between 1.6 and 3.

10. A process as defined in claim 9 including the further step of maintaining said first solution at substantially 70°–80° C. while dissolving said nickel sulfate and saccharin therein, and (B) maintaining said second solution at substantially 20°–30° C. while dissolving said nickel chloride, potassium chloride, cobaltous sulfate and ferrous ammonium sulfate therein.

11. A process as defined in claim 9 including the step of providing said buffering agent by dissolving boric acid in said first solution in a concentration sufficient to provide 35 to 60 grams per liter in said aqueous bath.

References Cited

UNITED STATES PATENTS

| | | | |
|---|---|---|---|
| 1,920,964 | 8/1933 | Burns | 204—43 |
| 1,960,029 | 5/1967 | Russell | 204—43 |
| 3,297,418 | 1/1967 | Firestone et al. | 204—43 XR |
| 3,370,979 | 2/1968 | Schmeckenbecher | 106—1 XR |

FOREIGN PATENTS

| | | |
|---|---|---|
| 212,848 | 5/1967 | Sweden. |

GERALD L. KAPLAN, Primary Examiner

UNITED STATES PATENT OFFICE
CERTIFICATE OF CORRECTION

Patent No. 3,533,922 Dated October 13, 1970

Inventor(s) Peter P. Semienko and Emil Toledo

It is certified that error appears in the above-identified patent and that said Letters Patent are hereby corrected as shown below:

Claim 1, line 18, column 5, "SO" should be --$SO_4$--.

Signed and sealed this 22nd day of June 1971.

(SEAL)
Attest:

EDWARD M.FLETCHER,JR.
Attesting Officer

WILLIAM E. SCHUYLER, JR.
Commissioner of Patents

USCOMM-DC 60376-P69
U.S. GOVERNMENT PRINTING OFFICE : 1969 O—366-334